(12) United States Patent
Li

(10) Patent No.: US 6,865,138 B1
(45) Date of Patent: Mar. 8, 2005

(54) BACK-UP DETECTING DEVICE WITH A DISTANCE RESET CAPABILITY

(76) Inventor: Shih-Hsiung Li, 2F-7, No. 23, Sec. 1, Hangchow S. Rd., Taipei (TW)

( * ) Notice: Subject to any disclaimer, the term of this patent is extended or adjusted under 35 U.S.C. 154(b) by 0 days.

(21) Appl. No.: 10/763,837

(22) Filed: Jan. 22, 2004

(51) Int. Cl.[7] .............................. G01S 15/00; G08G 1/16
(52) U.S. Cl. ........................... 367/99; 367/93; 367/909; 340/436; 340/904
(58) Field of Search .............................. 367/93, 95, 96, 367/99, 909; 340/435, 436, 903, 904

(56) References Cited

U.S. PATENT DOCUMENTS

| | | | | |
|---|---|---|---|---|
| 4,240,152 A | * | 12/1980 | Duncan et al. | ............ 340/904 |
| 4,551,722 A | * | 11/1985 | Tsuda et al. | ................ 340/904 |
| 4,980,869 A | * | 12/1990 | Forster et al. | ................ 367/99 |
| 5,059,946 A | * | 10/1991 | Hollowbush | ................ 340/435 |
| 5,235,315 A | * | 8/1993 | Cherry et al. | ................ 340/435 |
| 5,373,482 A | * | 12/1994 | Gauthier | ...................... 367/99 |

\* cited by examiner

*Primary Examiner*—Ian J. Lobo
(74) *Attorney, Agent, or Firm*—Dellett & Walters

(57) ABSTRACT

A back-up detecting device with a distance reset capability has a controller with an intensity analysis program and a distance reset function. When an ultrasonic transceiver is installed underneath a vehicle chassis forward of the rear end, a distance correction called a distance pad is measured, calculated and stored in memory by the distance reset function. The distance pad is the distance between the ultrasonic detector and the rear end of the vehicle. When the distance reset capability is used to determine a distance pad for each ultrasonic transceiver, the back-up detecting device presents accurate distances to objects without regard to the structure of the vehicle body without having to alter system hardware or software. Thus the back-up detecting device is suitable for large vehicles of varied shapes and sizes.

6 Claims, 6 Drawing Sheets

BACK-UP DETECTING DEVICE WITH A DISTANCE RESET CAPABILITY

BACKGROUND OF THE INVENTION

1. Field of the Invention

The present invention relates to a back-up detecting device with a distance reset capability, and more particularly to a back-up detecting device installable on a large vehicle, which has a capability of measuring an actual distance between the vehicle and an object that the vehicle approaches.

2. Description of Related Art

Most back-up detecting devices employ ultrasonic detection to determine the distance to objects to which a vehicle is approaching. A conventional back-up detecting device is an ultrasonic transmitter and receiver pair or an ultrasonic transceiver installed at the rear of a vehicle. The back-up detecting device emits ultrasonic sound waves. Any object in the field of view of the ultrasonic transmitter will reflect and return ultrasonic waves to the ultrasonic receiver from objects in the detection range of the ultrasonic receiver. The sound waves from the object will be detected, and an alarm will be triggered to warn the driver of an emergency situation.

A rear bumper of a truck is often flush with the body of the truck and is made of steel. Thus installing the detector on the bumper is more difficult. To get around the problem, the detector is attached to the metal chassis underneath the truck. However, the detector may not be flush with the rear of the truck.

With reference to FIG. 6, a conventional back-up detecting device (70) is installed on the chassis underneath a truck (71) forward of the rear end (72). Since sound waves emitted by the detector (70) propagate outward in a conical shape, some of the sound waves are reflected by the chassis of the truck (71) when the detector (70) is installed on the chassis and return to the detector (70). This installation will cause several problems. First the forward displacement of detector may cause the system to misjudge the distance to an object. Second, sound waves reflected by the chassis may trigger false alarms. Finally, the sound waves reflected by the chassis may jam the ultrasonic receiver and keep the receiver from detecting objects.

Some manufacturers use a filter in the detector to separate these noises from regular echoed pulses, but the body structure of each truck is somewhat different, and this is not an adequate solution for all installations.

Back-up detecting devices often employ an intensity analysis program that analyzes intensity of a returned signal to determine the distance to an object, and then use the distance to determine if the object is within a preset threshold range.

Before a detector system can determine a meaningful distance to an object, a distance correction, also known as a distance pad, must be determined for each detector, or a distance error occurs.

For example, a detector (70) detects an object, (80) behind the truck (71) at a measured distance D. However, the detector (70) is installed a distance D' from the rear end (72) of the truck (71), and the object (80) is only a distance (D−D') from the rear end (72) of the truck (71). Unless a distance pad is applied, the detector (70) treats the object (80) as if it were still at a distance D from the truck (71). Therefore the truck (71) would collide with the object (80) before the system could ever respond to the situation.

To overcome the problem with actual and calculated ranges, some manufacturers have introduced a correction or pad in the distance calculation formula. However, such a technique has been only partially successful, because of the variety of truck structures. Even though the technique mitigated the problem somewhat, a distance error remains in many installations.

SUMMARY OF THE INVENTION

The main objective of the present invention is to provide a back-up detecting device with a distance reset capability that allows the back-up detecting device to be installed underneath a vehicle close to a rear end of the vehicle but not exactly at the rear end, so the detector is still able to measure a distance to an object accurately and prevent false alarms.

The back-up detecting device with a distance reset capability in accordance with the present invention comprises a controller, multiple ultrasonic transceivers, a reset button, an alarm and a monitor.

The controller has an intensity analysis program and a distance reset function.

The multiple ultrasonic transceivers are linked to the controller respectively through signal conversion circuits, so the controller is able to control the emission of ultrasonic sound waves.

The reset button connected to the controller causes the controller to initiate the distance reset function when the button is depressed.

The monitor and the alarm connect to the controller, and the controller controls the alarm and the monitor operation.

The controller uses the intensity analysis program to process echoed signals and determine a distance to a detected object. Based on the distance to the object, the back-up detecting device determines whether to initiate the alarm to warn the driver if the object is within a threshold range, or just to display the distance on the screen continuously.

After the back-up detecting device is installed underneath the vehicle body near its rear end, the distance reset function is used to determine a distance pad for the actual location of the device and also to adapt to the structure of the vehicle body.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
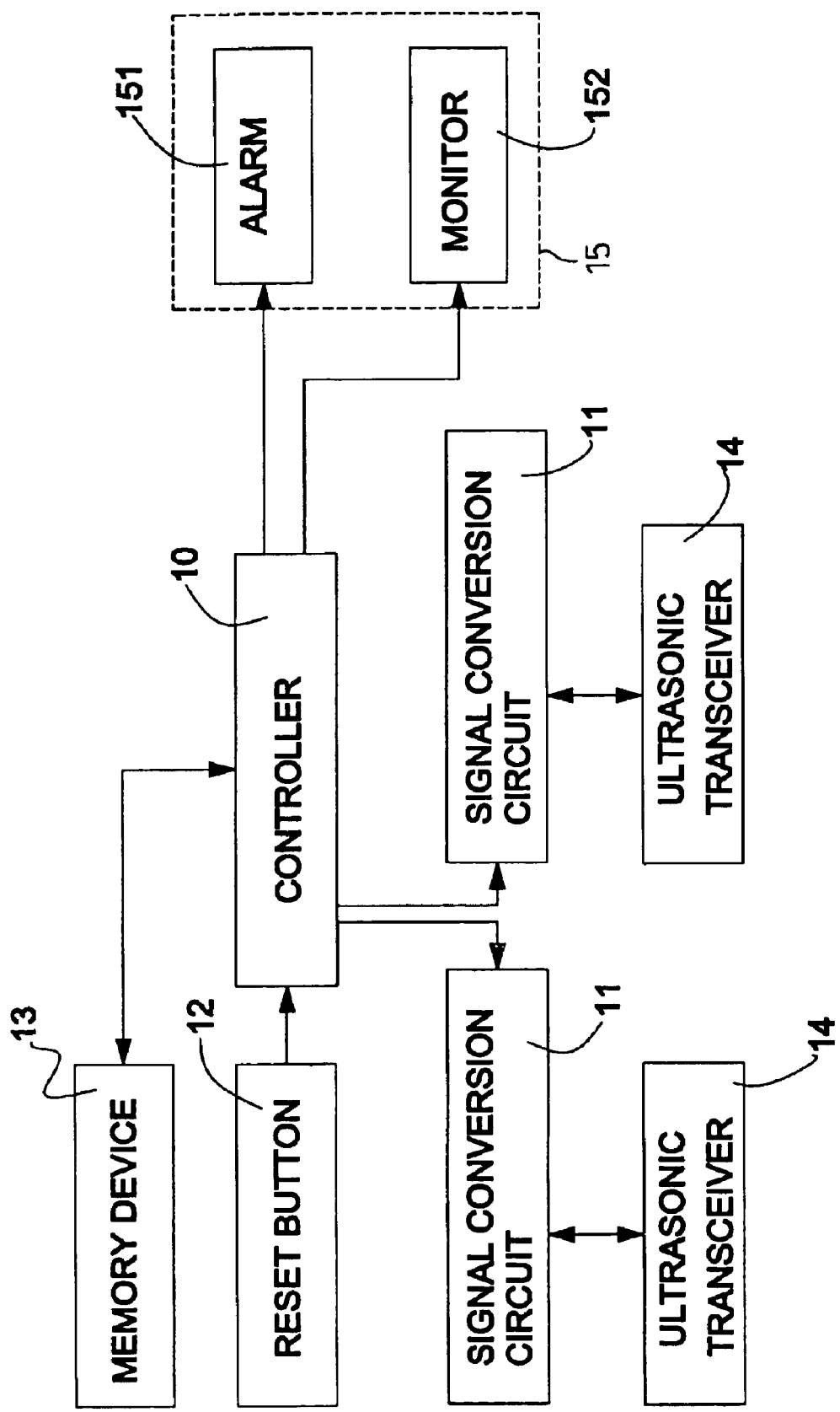
FIG. 1 is a functional block diagram of a back-up detecting device in accordance with the present invention.
Figure 4:
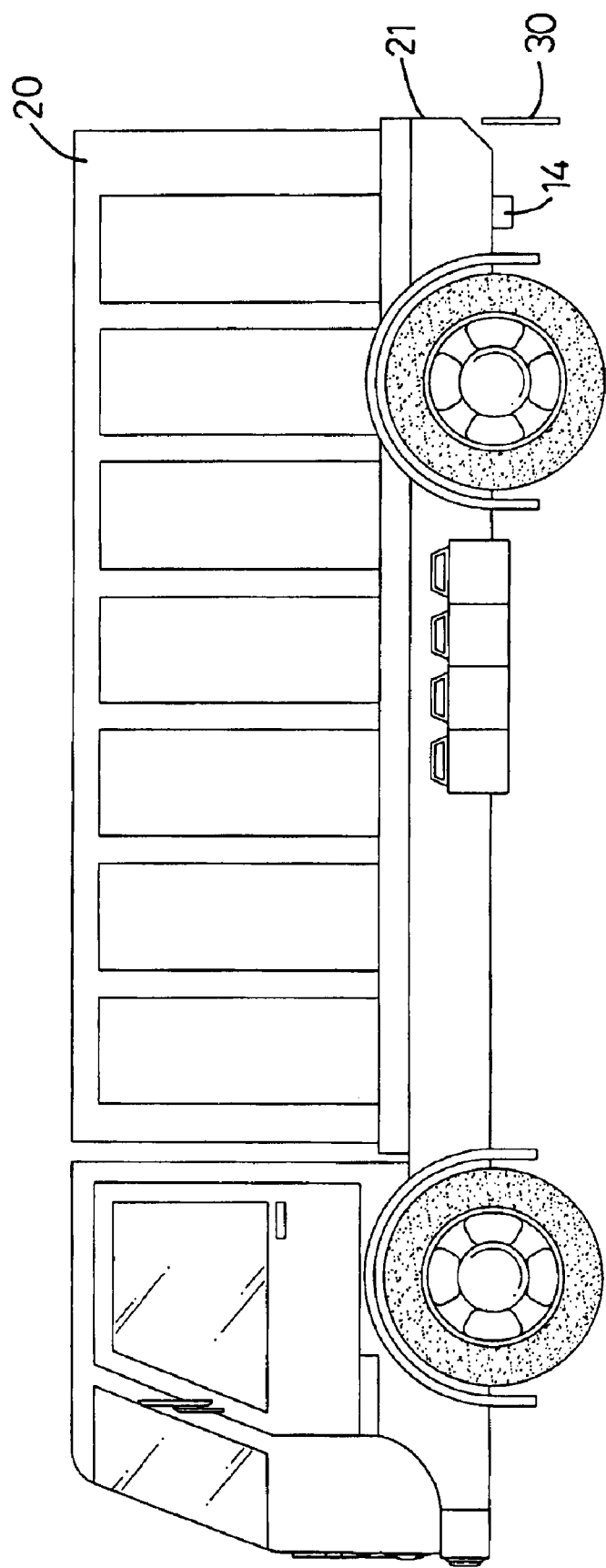
FIG. 4 is a side plan view of the back-up detecting device in FIG. 1 on a truck when the distance pad is being determined.

With reference to FIGS. 1 and 4, a back-up detecting device with a distance reset capability installable on a large vehicle in accordance with the present invention comprises a controller (10), multiple signal conversion circuits (11), multiple ultrasonic transceivers (14), a reset button (12), a memory device (13) and an alarm unit (15). The large vehicle (20) has a chassis (not numbered) and a rear end (21):

The controller (10) has an intensity analysis program (not shown), a distance reset capability (not shown), multiple inputs (not numbered) and multiple outputs (not numbered). The intensity analysis program calculates a distance between the vehicle (20) and an object based on the intensity of echoed pulses. The controller (10) uses the calculated distance to determine whether to initiate a warning or present video depending on the distance to the object.

The multiple signal conversion circuits (11) are connected to inputs of the controller (10) and respectively have an output (not numbered) connected to an input of the controller (10) and an input (not numbered).

The ultrasonic transceivers (14) are mounted on the chassis underneath a vehicle (20) near the rear end (21), transmit ultrasonic sound waves, receive reflected sound waves, respectively have an output and are connected respectively to signal conversion circuits (11) through which the controller (10) controls the emission of ultrasonic pulses.

The reset button (12) is connected to an input of the controller (10) and initiates the distance reset function when the button (12) is depressed.

The memory device (13) is connected to the controller (10) and stores a distance pad $D_o$.

The alarm unit (15) consists of an alarm (151) and a monitor (152) and connects to the controller (10), and the controller (10) is able to initiate the alarm (151), send data to the monitor (152) or both.

If the vehicle (20) distance to an object is within a threshold range, the controller (10) will cause the alarm (151) to emit a beeping sound that increases in frequency as the distance decreases. Otherwise the controller (10) will continuously output the distance through the monitor (152) to inform the driver of the current distance to the object.

In calculating the distance between the vehicle (20) and the object, the controller (10) applies a distance pad measured and calculated by the distance reset function. The distance pad is deducted from the measured distance to obtain an actual distance to the object.

Therefore, the distance pad determines the accuracy of the distance measurement. Every time the controller (10) receives an echoed pulse, the distance pad is retrieved from the memory (13) and applied to the distance calculation.

Figure 2:
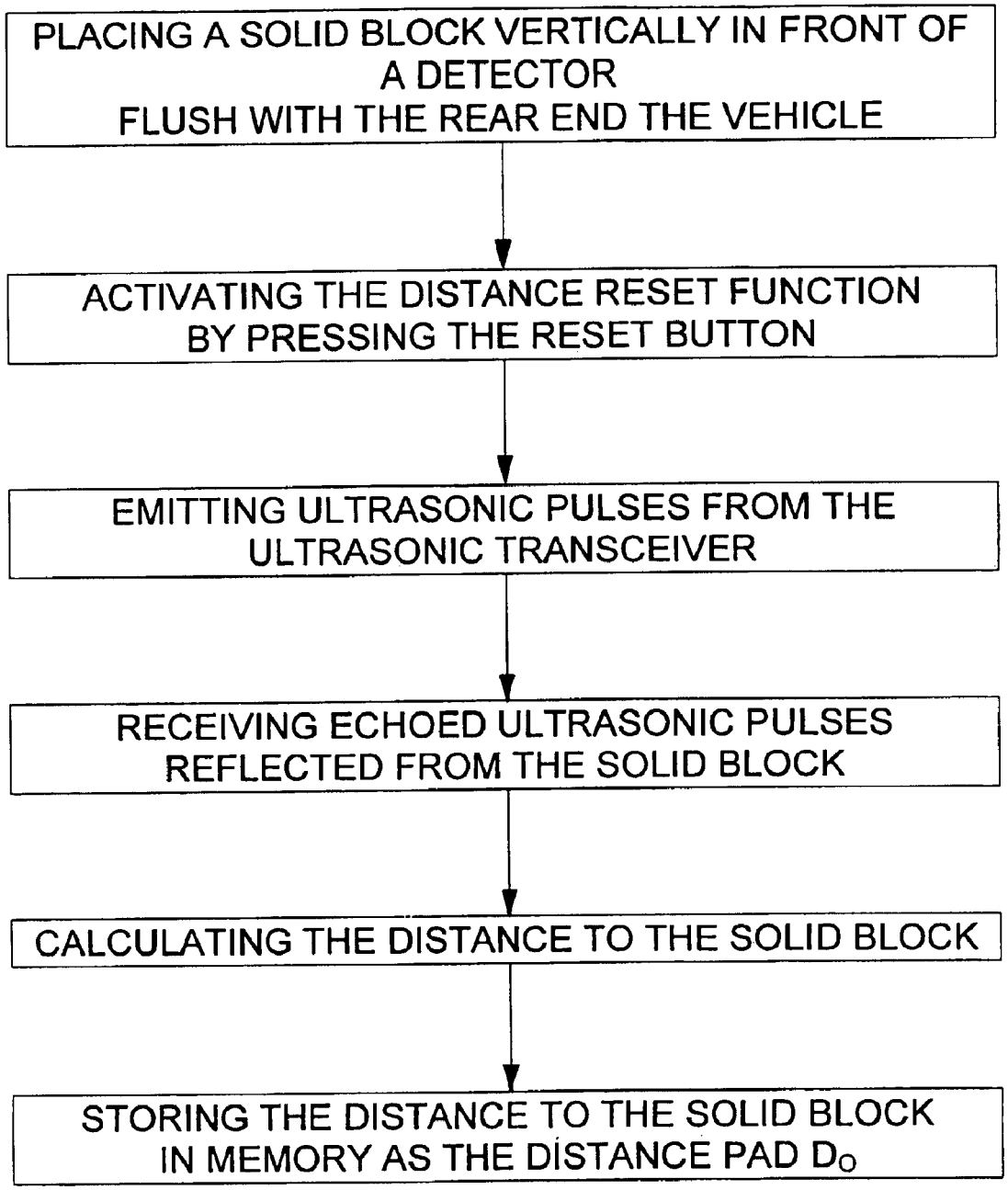
FIG. 2 is a flow chart of a method to determine a distance pad for the back-up detecting device in FIG. 1.
Figure 5:
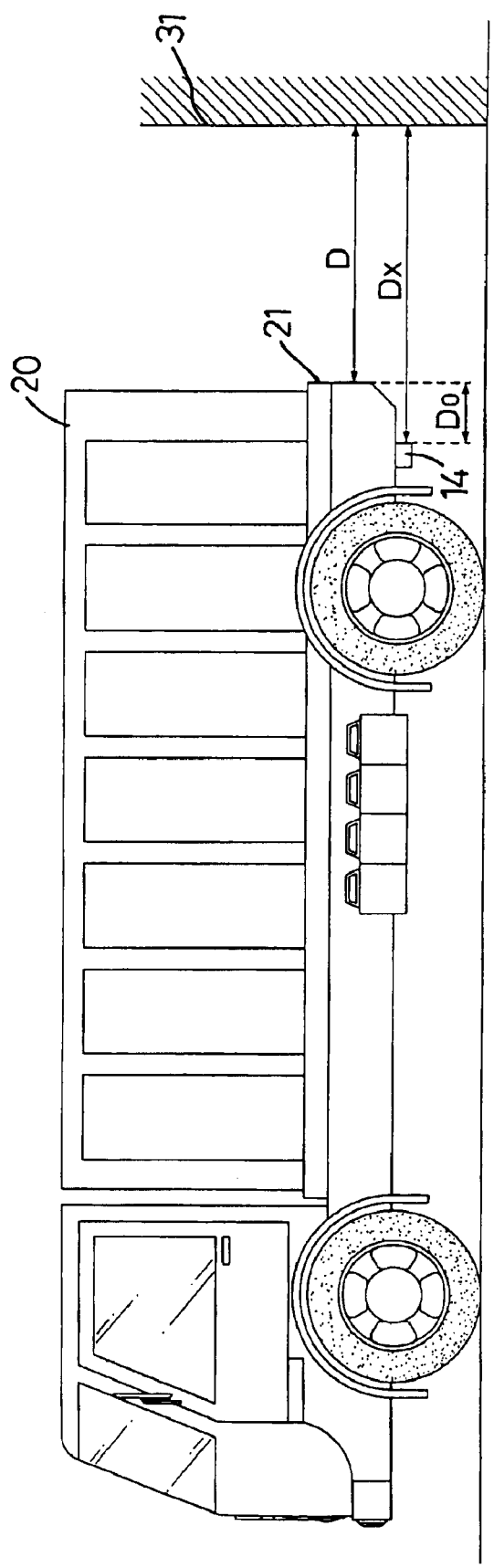
FIG. 5 is a side plan view of a truck with the back-up detecting device in FIG. 1 showing the measured distance ($D_x$), the actual distance (D) and the distance pad ($D_0$)
Figure 6:
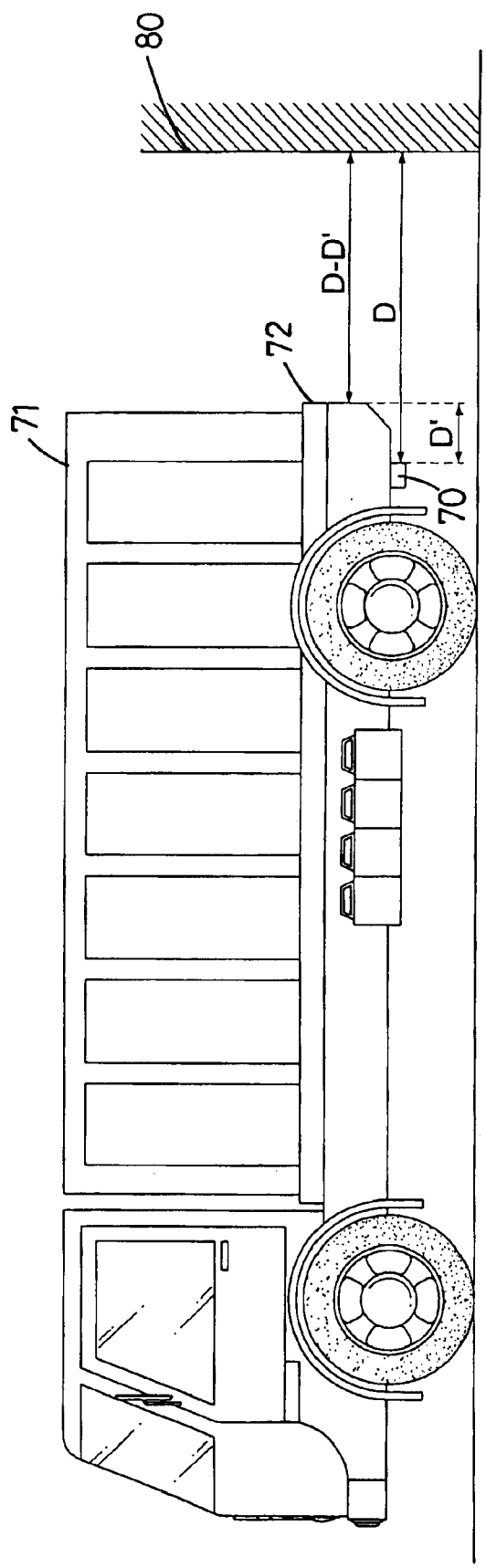
FIG. 6 is a side plan view of a truck with a conventional back-up detecting device showing the measured distance (D), the actual distance (D−D') and the distance error (D').

With reference to FIGS. 2, 4 and 5, the distance reset function that generates a distance pad $D_o$ comprises the steps of placing a solid block (30) in front of a detector (14), activating the distance reset function, emitting ultrasonic pulses, receiving echoed ultrasonic pulses, calculating a distance to the solid block and storing the distance to the solid block as the distance pad $D_o$.

The step of placing a solid block (30) vertically in front of a detector (14) and flush with the rear end (21) of the vehicle (20) may be performed by suspending a solid block (30) from the rear end of the vehicle (20) or simply backing the vehicle against a solid wall (not shown).

The step of activating the distance reset function comprises simply pressing the reset button (12) down which causes the controller (10) to activate the distance reset function.

In the step of emitting ultrasonic pulses, the controller (10) triggers the ultrasonic transceiver (14) that emits an ultrasonic pulse.

In the stepreceiving the echoed ultrasonic pulses, pulses reflected by the solid block (30) are received by the ultrasonic transceiver (14) and sent to the controller (10).

The step of calculating the distance to the solid block (30) is performed by the intensity analysis program in the controller (10).

In the step of storing the distance to the solid block (30) as the distance pad $D_o$ the controller (10) stores the distance pad $D_o$ in the memory device (13).

Thereafter, every time the back-up detecting device is enabled to measure the distance to an object, the controller (10) will retrieve the distance pad $D_o$ for application in the calculation of the actual distance to an object.

Figure 3:
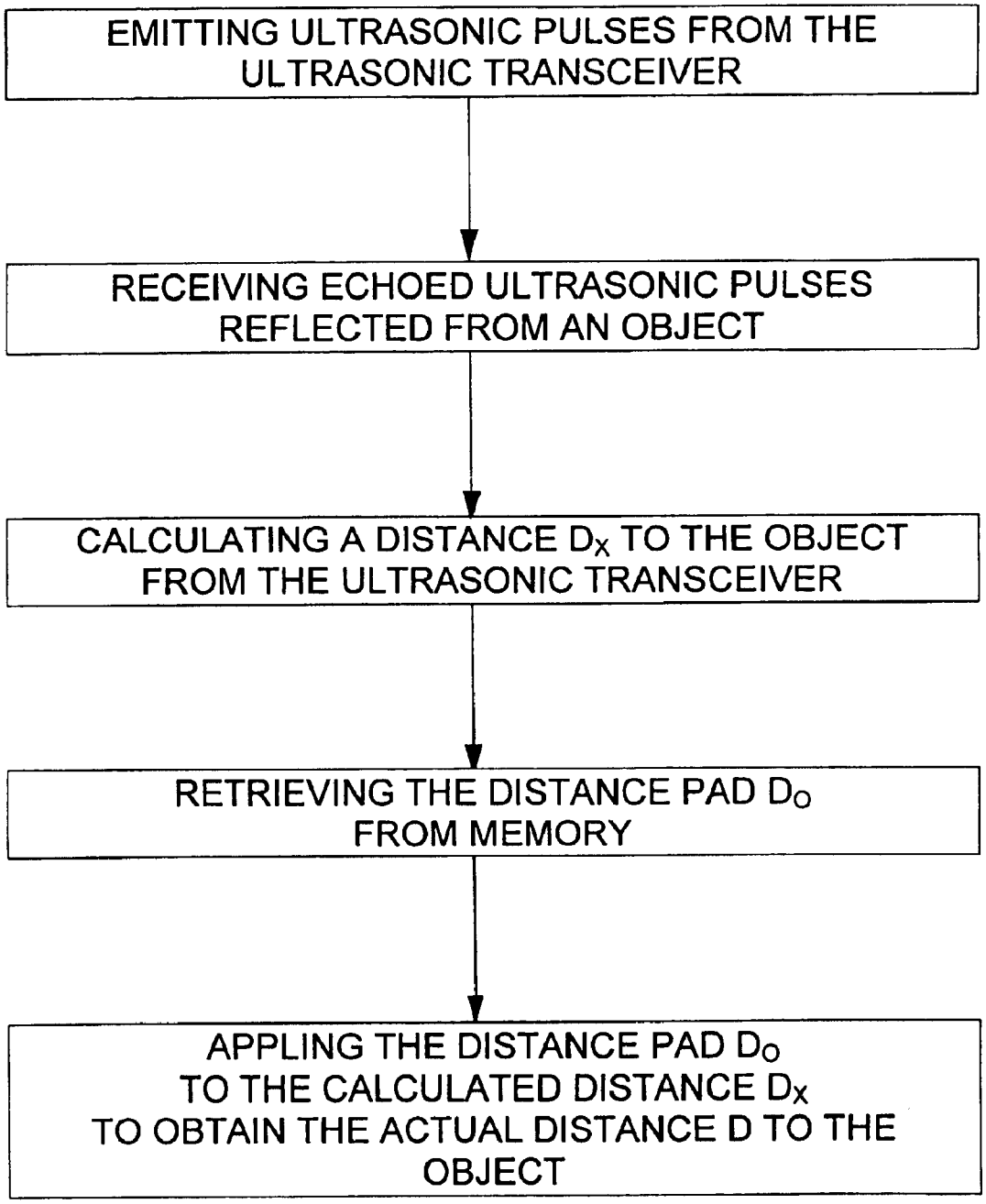
FIG. 3 is a flow chart of the method to calculate the distance to an object in the back-up detecting device in FIG. 1.

With reference to FIGS. 3 and 5, the intensity analysis program in the controller (10) uses the following steps to calculate the actual distance D to an object: emitting ultrasonic pulses, receiving echoed ultrasonic pulses from an object, calculating a distance $D_x$ to an object from the ultrasonic transceiver, retrieving the distance pad $D_o$ and applying the distance pad $D_o$ to obtain the distance D to the object.

The step of emitting ultrasonic pulses is performed by the ultrasonic transceivers (14).

The step of receiving echoed ultrasonic pulses from an object is performed by the ultrasonic transceivers (14). The received pulses are sent to the controller (10) through the corresponding signal conversion circuits (11).

The step of calculating a distance $D_x$ to an object from the ultrasonic transceiver (14) is performed by the intensity analysis program in the controller (10).

In the step of retrieving the distance pad $D_o$, the controller (10) retrieves the distance pad $D_o$ from the memory device (13);

In the step of applying the distance pad $D_o$ to obtain the distance D to the object, the distance pad $D_o$ is subtracted from the distance $D_x$ to an object from the ultrasonic transceiver (14) to obtain the actual distance D from the rear end (21) the vehicle to the object.

Further, another embodiment of the present invention could further comprises an intensity comparison step before the foregoing subtracting step ($D_x$-$D_0$). In the intensity comparison step, the intensity of the echoed ultrasonic signal will be compared to the intensity of the signal that is used to calculate the distance pad $D_0$. Only when a significant intensity difference exists, the subtracting ($D_x$-$D_0$) would be executed to calculate the actual distance D to the object. In this embodiment, since the controller does not need to execute the subtracting step, its loading could be reduced.

In conclusion, the back-up detecting device with a distance reset capability in accordance with the present invention obviates the necessity to change the original system hardware and software to suit vehicles with different shapes and sizes.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A back-up detecting device with a distance reset capability for a large vehicle with a chassis and a rear end, the back-up detecting device comprising:

a controller (10) having multiple inputs, multiple outputs, an intensity analysis program and a distance reset capability;

multiple signal conversion circuits (11) connected to inputs of the controller (10);

multiple ultrasonic transceivers (14) are mounted on the chassis underneath a vehicle (20) near the rear end (21), transmit ultrasonic sound waves, receive reflected sound waves, respectively have an output and are connected respectively to signal conversion circuits (11) through which the controller (10) controls the emission of ultrasonic pulses;

a reset button (12) connected to an input of the controller (10) and initiates a distance reset function when the button (12) is depressed;

a memory device (13) connected to the controller (10) and storing a distance pad $D_o$; and an alarm unit (15) connected to an output of the controller (10).

2. The back-up detecting device according to claim 1, wherein the alarm unit (15) has an alarm (151).

3. The back-up detecting device according to claim 1, wherein the alarm unit (15) has a monitor (152).

4. The back-up detecting device according to claim 1, wherein the alarm unit (15) has an alarm (151) and a monitor (152).

5. The back-up detecting device according to claim 1, wherein the distance reset function comprises the steps of:

placing a solid block (30) vertically in front of a detector (14) flush with the rear end (21) of the vehicle (20);

activating the range reset function by pressing the reset button (12);

emitting ultrasonic pulses from the ultrasonic transceiver (14);

receiving echoed ultrasonic pulses reflected from the solid block (30);

calculating the distance to the solid block (30); and storing the distance to the solid block (30) in memory as the distance pad ($D_o$).

6. The back-up detecting device according to claim 1, wherein the intensity analysis program comprises the steps of:

emitting ultrasonic pulses from the ultrasonic transceiver (14);

receiving echoed ultrasonic pulses echoed back from an object;

calculating a distance $D_x$ from the ultrasonic transceiver (14);

retrieving a distance pad ($D_o$) from memory (13); and applying the distance pad $D_o$ to the measured distance $D_x$ to obtain an actual distance D from the vehicle body to the object by subtracting the distance pad $D_o$ from the measured value $D_x$.

* * * * *